(No Model.) 2 Sheets—Sheet 1.

D. W. INMAN.
HARROW.

No. 421,572. Patented Feb. 18, 1890.

ATTEST
J. Henry Kaiser.
A. L. Evans.

INVENTOR.
David W. Inman
by Charles E. Adamson
his Attorney (No Model.) 2 Sheets—Sheet 2.

D. W. INMAN.
HARROW.

No. 421,572. Patented Feb. 18, 1890.

ATTEST.
J. Henry Kaiser
A. L. Evans

INVENTOR
David W. Inman
by Charles E. Adamson
his Attorney

N. PETERS, Photo-Lithographer, Washington, D.C.

UNITED STATES PATENT OFFICE.

DAVID W. INMAN, OF STELVIDEO, OHIO.

HARROW.

SPECIFICATION forming part of Letters Patent No. 421,572, dated February 18, 1890.

Application filed September 17, 1889. Serial No. 324,191. (No model.)

*To all whom it may concern:*

Be it known that I, DAVID W. INMAN, a citizen of the United States, residing at Stelvideo, in the county of Darke and State of Ohio, have invented certain new and useful Improvements in Harrows; and I do hereby declare the following to be a full, clear, and exact description of the invention, such as will enable others skilled in the art to which it appertains to make and use the same.

My invention relates to improvements in harrows; and it consists in certain novelty in the construction, arrangement, and combination of the various parts of the same, all of which I will now proceed to point out and describe, reference being had to the accompanying drawings, in which—

Figure 1:
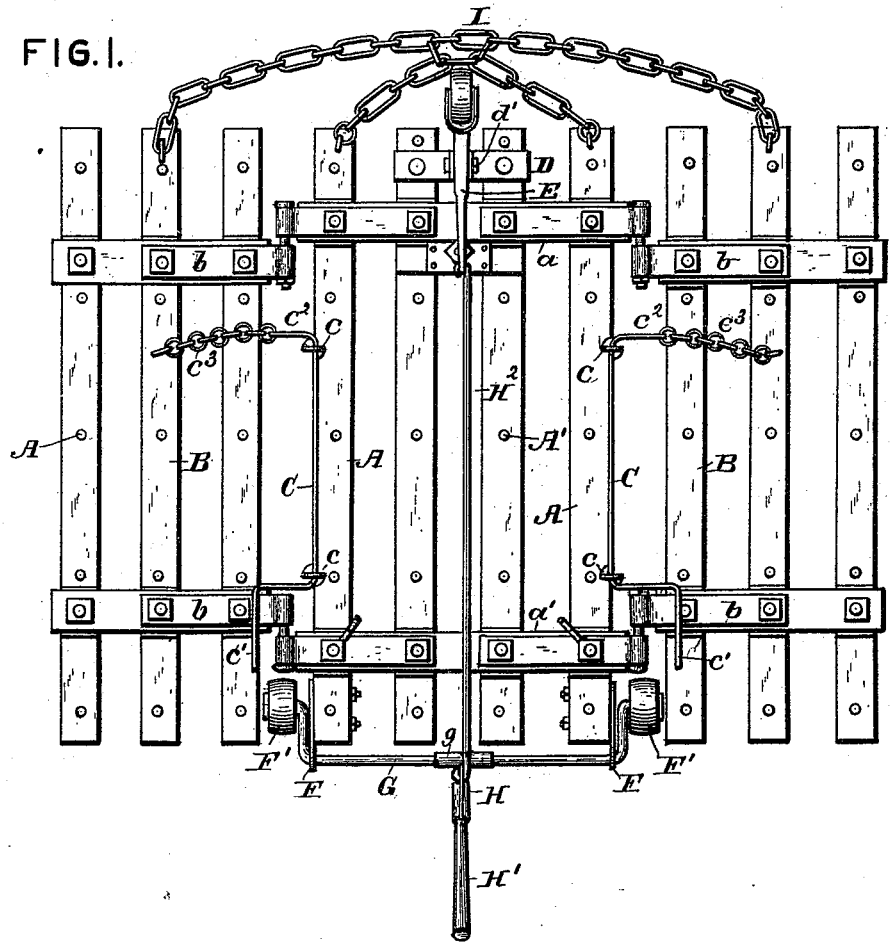
Figure 2:
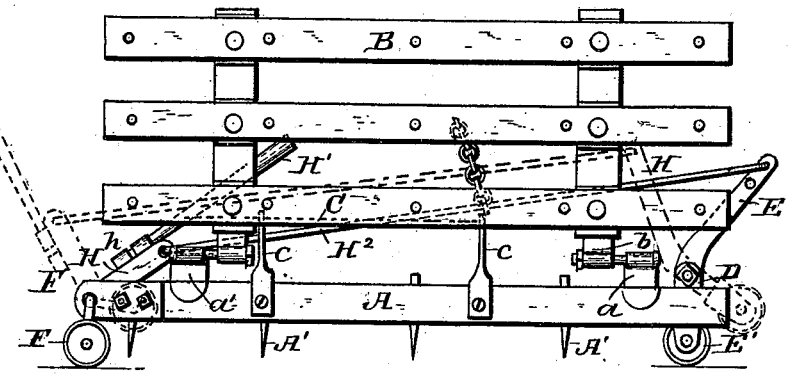
Figure 3:
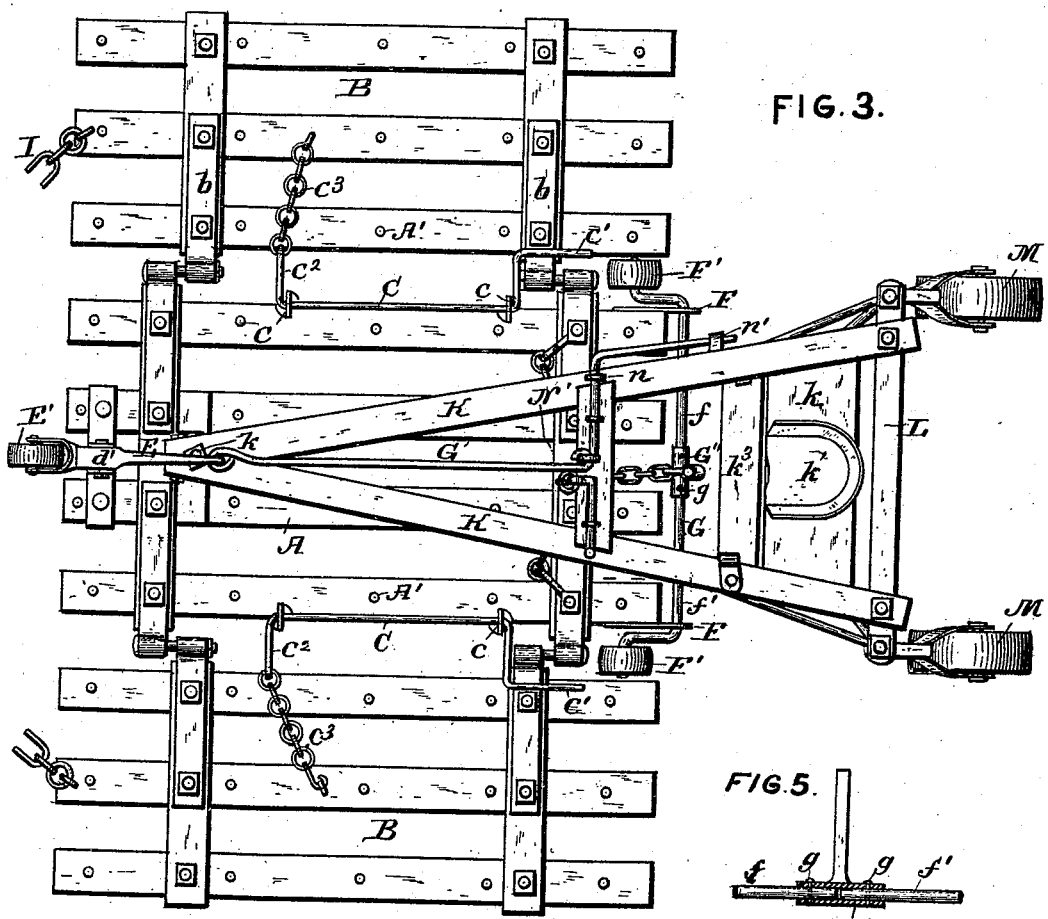
Figure 5:
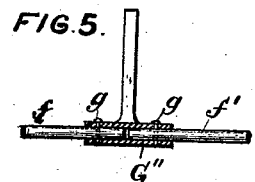
Figure 4:
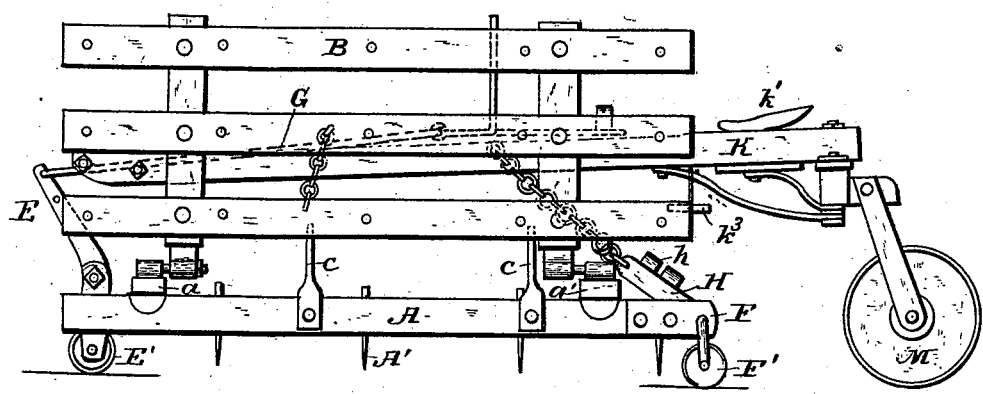

Figure 1 is a top plan view of a harrow embodying my invention, the sulky attachment being removed. Fig. 2 is a side elevation of the harrow illustrated in Fig. 1, the parts of the same being shown in an inoperative position. Fig. 3 is a top plan view of the harrow provided with the sulky attachment; Fig. 4, a side elevation of the same, the parts being shown in an inoperative position, and Fig. 5 is a detail of parts of the invention.

Referring to said drawings, A represents the main frame of the harrow, which is of the ordinary construction and substantially rectangular in form, consisting of the longitudinal bars $a$ and cross-bars $a'$.

A' are the harrow-teeth attached to the frame in any desired manner.

B B are similarly-constructed hinged sections attached to the sides of the main section by suitable hinges $b\ b$.

On each side of the main section are rock-shafts G, mounted in suitable bearings $c$ and having crank-handles $c'$ at one end and at their other ends crank lever-arms $c^2$, which are connected by chains $c^3$, or other suitable flexible connections, with the hinged sections B. By means of said rock-shafts and lever-arms the hinged sections may be raised to an inoperative position, as shown in Figs. 2 and 4, and allowed to rest upon the main section, or upon the sulky-frame, hereinafter described. If desired, suitable catches may be employed to retain the hinged sections in an elevated position. Ordinarily, however, they are not required.

Secured to the center of the front cross-bar of the frame is a bearing D, in which is pivoted an arm E by means of a bolt $d$, passing through said arm and the bearing. To the lower end of said arm is attached a caster-wheel E'.

To the rear corners of the main section of the frame are secured bearings F, in which is mounted a rock-shaft G, having crank ends on which are mounted small wheels or rollers F'. Said rock-shaft is formed in two sections $f$ and $f'$, united by a sleeve C, the sleeve being secured to the sections by suitable pins $g$, or by means of set-screws. This construction of the rock-shaft is illustrated in Fig. 5. Projecting from the center of the sleeve is an arm H, arranged at about right angles to the crank ends of the rock-shaft.

$h$ is a socket in the arm H, in which is secured a lever H'. The arm H and pivoted arm E are connected by a rod $H^2$, pivotally secured to said arms.

When in the position shown in Fig. 1 and in dotted lines of Fig. 2, the front caster-wheel and rear wheels are raised so as to be above the lower ends of the harrow-teeth. In this position the harrow is ready for operation. When the lever H' is moved forward, as shown in full lines, Fig. 2, the wheels are lowered below the harrow-teeth and the harrow is in an inoperative position, said wheels forming substantially a truck for transporting the same.

Connected to the main and hinged sections are suitable draft-chains I, to which the team may be attached in the ordinary manner. It will of course be understood that any other desired means may be employed for attaching the team to the harrow.

So far as described my invention forms what is generally known as a "walking-harrow," in which the operator walks behind the same. In connection with the same I provide a sulky attachment on which the driver may ride, the construction of which is as follows: Said sulky attachment consists of a V-shaped or triangular frame K, extending over the main section of the frame and back of the same, and having its apex pivotally secured to the forward part of the main section at its center by a bolt $k$.

Extending across the rear end of the triangular sulky-frame is a cross-bar L, to the ends of which I attach caster-wheels M of sufficient size to raise the rear of the sulky-frame above the main section of the harrow.

$k'$ is the driver's seat secured to a cross-bar $k^2$. In front of and below the driver's seat is swinging foot-rest $k^3$. When the sulky attachment is employed, the rod $H^2$ is removed and a shorter rod N is pivotally secured at one end to the pivoted arm E, its rear end being pivotally connected to the end of a crank-lever N', pivoted or fulcrumed on a cross-bar $n$ on the sulky-frame.

$n'$ is a catch adapted to engage the lever when the front caster-wheel is lowered and hold the same as adjusted. O is a crank-lever, also pivoted or fulcrumed on the cross-bar $n$, which is connected by a chain $o$, or other flexible connection, with the arm H, attached to the rock-shaft G, carrying the rear wheels F'. By means of this lever said wheels may be raised or lowered when the sulky attachment is used.

$o'$ is a catch adapted to engage the end of the lever O and hold the same when it is drawn back to lower the said rear wheels, and thus hold the same as adjusted. When in use, the front and rear wheels on the main section of the harrow are in the position shown in dotted lines, Fig. 4. When it is desired to use said wheels as a truck, they are lowered below the harrow-teeth by means of the levers described. If desired, the rear wheels may be removed and the chain $o$ connected directly to the main frame of the harrow. The lever O, when operated, would then raise the rear end of the frame and support it from the sulky-frame. Said sulky-frame is also connected to the main frame by suitable chains P, attached to each side of the same. Said chains limit the lateral movement of the sulky-frame with relation to the main harrow-frame, but permit said sulky-frame to have sufficient play to enable the harrow to be readily turned. When the sulky attachment is employed, the lever H' is removed.

It will be seen from the above description that the sulky attachment may or may not be used, as desired.

By means of the adjustable wheels forming the truck the harrow can be easily transported to and from the field, and when the truck is not needed the wheels may be raised above the harrow-teeth and said harrow placed in an operative position. The hinged sections are also of great advantage, especially when transporting the harrow, as they may be folded up on top of the main section, thus decreasing the width of said harrow.

Having thus fully described my invention, what I claim as new, and desire to secure by Letters Patent, is—

1. The combination, with the harrow-frame A, having hinged side sections B, of a bearing D, attached to the forward end of the frame A, an arm E, pivoted to said bearing, a caster-wheel E', secured to the lower end of said arm E, a rock-shaft G, mounted in bearings F at the rear of the frame A and having crank ends and wheels mounted upon said crank ends, a lever H', secured to said rock-shaft, and a rod $H^2$, connecting said lever with the pivoted arm E, all constructed, arranged, and operating substantially as shown and described.

2. In a harrow, the combination, with the harrow-frame A, the arm E, pivoted to the forward end of said frame, the caster-wheel E', secured to said arm, the rock-shaft G, mounted in bearings at the rear of the frame and having crank ends and wheels F' mounted thereon, and a lever-arm H, secured to said rock-shaft, of the triangular sulky-frame K, extending over said frame and having its forward end pivoted to said frame, and caster-wheels M, supporting the rear end of said sulky-frame, the lever N' and rod N, connecting said lever with the arm E, and the lever O and chain $o$, connecting said lever with the arm H, all constructed, arranged, and operating substantially as shown and described.

In testimony whereof I affix my signature in presence of two witnesses.

DAVID W. INMAN.

Witnesses:
 A. H. MEEHES,
 E. C. WRIGHT.